(12) United States Patent  (10) Patent No.: US 7,730,272 B2
Lee  (45) Date of Patent: Jun. 1, 2010

(54) NON-VOLATILE MEMORY DEVICE AND METHOD OF ENCRYPTING DATA IN THE SAME

(75) Inventor: Jin Haeng Lee, Seoul (KR)

(73) Assignee: Hynix Semiconductor Inc., Icheon-si (KR)

( * ) Notice: Subject to any disclaimer, the term of this patent is extended or adjusted under 35 U.S.C. 154(b) by 559 days.

(21) Appl. No.: 11/753,359

(22) Filed: May 24, 2007

(65) Prior Publication Data

US 2008/0162851 A1    Jul. 3, 2008

(30) Foreign Application Priority Data

Dec. 27, 2006    (KR) .................... 10-2006-0134931

(51) Int. Cl.
G06F 12/00    (2006.01)
G06F 13/00    (2006.01)
G06F 13/28    (2006.01)

(52) U.S. Cl. ..................... 711/163; 711/154; 711/164

(58) Field of Classification Search ................. None
See application file for complete search history.

(56) References Cited

U.S. PATENT DOCUMENTS 5,765,197 A * 6/1998 Combs .................... 711/164
5,943,283 A * 8/1999 Wong et al. .............. 365/230.01
6,122,716 A * 9/2000 Combs .................... 711/163
6,487,646 B1 * 11/2002 Adams et al. ............ 711/163
6,510,090 B1 * 1/2003 Chida ...................... 365/195
6,665,782 B2 * 12/2003 Capps, Jr. et al. ........ 711/163
2005/0198404 A1 * 9/2005 Kawakami et al. ........ 710/1
2007/0061595 A1 * 3/2007 Chen ....................... 713/193

FOREIGN PATENT DOCUMENTS

KR    1020020047342 A    6/2002
KR    100446336 B1    8/2004
KR    10-2005-0066340 A    6/2005

* cited by examiner

*Primary Examiner*—Matt Kim
*Assistant Examiner*—Ralph A Verderamo, III
(74) *Attorney, Agent, or Firm*—Townsend and Townsend and Crew LLP

(57) ABSTRACT

A non-volatile memory device includes an input/output terminal mixing section configured to couple data input/output terminals of the memory device to data input/output terminals of a page buffer in accordance with a user selection. A user data authenticating section is configured to transmit a control signal to the input/output terminal mixing section so that the input/output terminal mixing section couples the data input/output terminals of the memory device to the data input/output terminals of the page buffer in accordance with the user selection. A spare cell is configured to store the coupling configuration of the data input/output terminals of the memory device and the data input/output terminals of the page buffer in accordance with the user selection.

9 Claims, 4 Drawing Sheets

NON-VOLATILE MEMORY DEVICE AND METHOD OF ENCRYPTING DATA IN THE SAME

CROSS-REFERENCE TO RELATED APPLICATIONS

This application claims priority to Korean Patent Application No. 2006-134931, filed on Dec. 27, 2006, the contents of which are incorporated herein by reference in its entirety.

BACKGROUND OF THE INVENTION

The present invention relates to a non-volatile memory device and method of encrypting data in the same. More particularly, the present invention relates to a non-volatile memory device having an apparatus for applying a specific encryption algorithm to data that is input to an input/output (IO) line and then storing the encrypted data, and a method of encrypting data in the same.

The demand has increased for a non-volatile memory device which electrically programs and erases data and does not need to refresh when periodically rewriting data. A non-volatile memory device is employed for storing multimedia data in various portable digital apparatuses such as a mobile telephone, an MP3 player, a digital camera, a PDA, etc. However, when the portable digital apparatus is lost or stolen, the data stored in the non-volatile memory device in the portable digital apparatus may be accessed by another person.

SUMMARY OF THE INVENTION

It is a feature of the present invention to provide a non-volatile memory device for storing data in a certain mixed storage order in accordance with user selection and reading the stored data in the storage order, and a method of encrypting the data in the same.

In one embodiment, a non-volatile memory device includes an input/output terminal mixing section configured to couple data input/output terminals of the memory device to data input/output terminals of a page buffer in accordance with a selection of a user. The non-volatile memory device also includes a user data authenticating section configured to transmit a control signal to the input/output terminal mixing section so that the input/output terminal mixing section couples the data input/output terminals of the memory device to the data input/output terminals of the page buffer in accordance with the selection of the user. The non-volatile memory device further includes a spare cell configured to store the coupling configuration of the data input/output terminals of the memory device and the data input/output terminals of the page buffer in accordance with the selection of the user.

In another embodiment, a method of encrypting data in a non-volatile memory device includes receiving a user's ID when a data write operation is performed in the memory device. A coupling mode between data input/output terminals of the memory device and data input/output terminals of a page buffer is received in accordance with a selection of a user. The user's ID and the coupling mode is stored in a given storage section. The data input/output terminals of the memory device are coupled to the data input/output terminals of the page buffer in accordance with the coupling mode, thereby performing the data write operation in the memory device.

As described above, a user may vary a storage order of data in a non-volatile memory device of the present invention, and read the data in the storage order. As a result, an unauthorized person may not access the data stored in the non-volatile memory device.

BRIEF DESCRIPTION OF THE DRAWINGS

The above and other features and advantages of the present invention will become readily apparent by reference to the following detailed description when considered in conjunction with the accompanying drawings, wherein.

DESCRIPTION OF SPECIFIC EMBODIMENTS

Hereinafter, the preferred embodiments of the present invention will be explained in detail with reference to the accompanying drawings.

Figure 1:
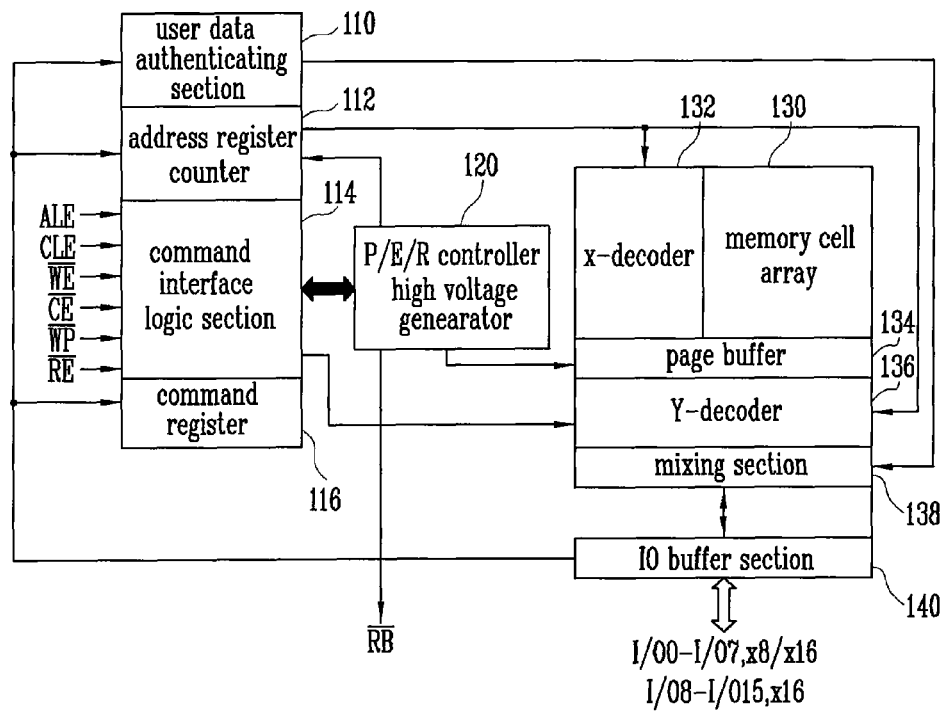
FIG. 1 is a block diagram illustrating a non-volatile memory device according to an embodiment of the present invention.

FIG. 1 is a block diagram illustrating a non-volatile memory device according to an embodiment of the present invention.

The non-volatile memory device includes a memory cell 130 array for storing specific data, a page buffer 134 for storing data when a certain cell in the memory cell array is programmed or read in a unit of a page, an X-decoder 132 for selecting a certain column in the memory cell array, a Y-decoder 136 for selecting a certain row in the memory cell array, a P/E/R controller and a high voltage generator 120 for controlling a program/erase/read (P/E/R) operation of the page buffer and generating high voltages required for each P/E/R operation. The non-volatile memory device also includes a command interface logic section 114, a command register 116, an address register and a counter 112, etc., which processes commands provided to the elements included therein. The non-volatile device further includes an IO buffer section 140 for receiving external data and providing the received data to the memory cell array and various controllers. Additionally, the non-volatile memory device includes an user data authenticating section 110 for authenticating a user, and an input/output terminal mixing section 138 for mixing a transmission order of data in accordance with the user selection 110 before the data provided to the IO buffer section 140 is transmitted to the memory cell array 130.

The user data authenticating section 110 authenticates a user's ID to certify the user, and controls the data mixing of the input/output terminal mixing section 138 in accordance with a coupling mode input by the user. This will be described in detail below with reference to the accompanying drawings.

Figure 2:
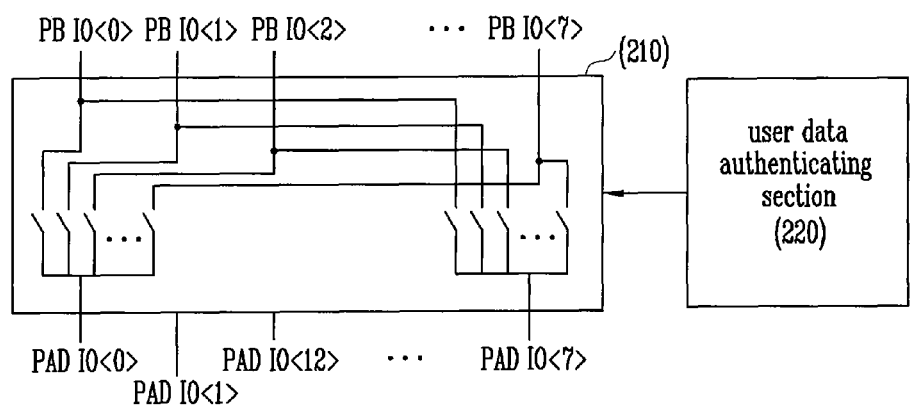
FIG. 2 is a view illustrating a input/output terminal mixing section and a user data authenticating section according to an embodiment of the present invention.

FIG. 2 is a view illustrating the input/output terminal mixing section and the user data authenticating section according to an embodiment of the present invention.

The input/output terminal mixing section 210 couples N data input/output terminals of the memory device to N data input/output terminals of the page buffer in accordance with a user selection. In other words, the input/output terminal mixing section 210 couples page buffer input/output terminals (PB IO<0:7>) to memory input/output terminals (PAD IO<0:7>) in accordance with the user selection. The page buffer input/output terminals PB IO<0:7> are coupled to the page buffer, and the memory input/output terminals IO<0:7> are coupled to the IO buffer section.

The input/output terminal mixing section 210 also includes N switches for selectively coupling the data input/output terminals of the page buffer to the N data input/output terminals of the memory device.

As shown in FIG. 2, the input/output terminal mixing section 210 includes eight switches for coupling PB IO<0> to a given PAD IO terminal, and an additional eight switches for coupling PB IO<1> to a given PAD IO terminal. In other words, the input/output terminal mixing section 210 includes n switches for coupling PB IO<n> to a given PAD IO terminal. However, the configuration of the input/output terminal mixing section 210 may be varied in accordance with the IO buffer section. For example, when data is input or output in accordance with a X16 or X32 configuration in the IO buffer section, the number of switches included in the input/output terminal mixing section 210 may be varied accordingly.

In one embodiment, activation of the switches may be controlled by the user data authenticating section 220. The user data authenticating section 220 transmits a control signal to the input/output terminal mixing section 210 in accordance with the user selection. The control signal causes the input/output terminal mixing section 210 to couple the data input/output terminals. For example, when the user wants to couple PB IO<0> to PAD IO<1>, the user data authenticating section 220 transmits the control signal for activating the corresponding switch to the input/output terminal mixing section 210.

The above step may be repeated for each data transmission line of the IO buffer section such that each page buffer input/output terminal PB IO<0:7> may be coupled to each memory input/output terminal PAD IO<0:7>. As a result, data is stored in the memory cell array in accordance with a user selected order without specific processing for input/output data.

Information regarding the coupling order of the data input/output terminals is stored in a spare cell (not shown) of the memory cell array. As a result, when data is read, only a user which knows the coupling order information that is stored in the spare cell may couple the input/output terminals with the same coupling configuration as the input data, thereby outputting the data in the same order as the input data.

If a user does not know the coupling order information, the input/output terminals are coupled with a coupling configuration that is different than that of the input data. As a result, the data is output in an order that is different than the input data.

In addition, a specific user's ID is received, and a received ID is stored in the spare cell. The non-volatile memory device determines whether or not the user's ID corresponds to the ID stored in the spare cell.

Hereinafter, a data write operation and a data read operation will be described in detail.

Figure 3:
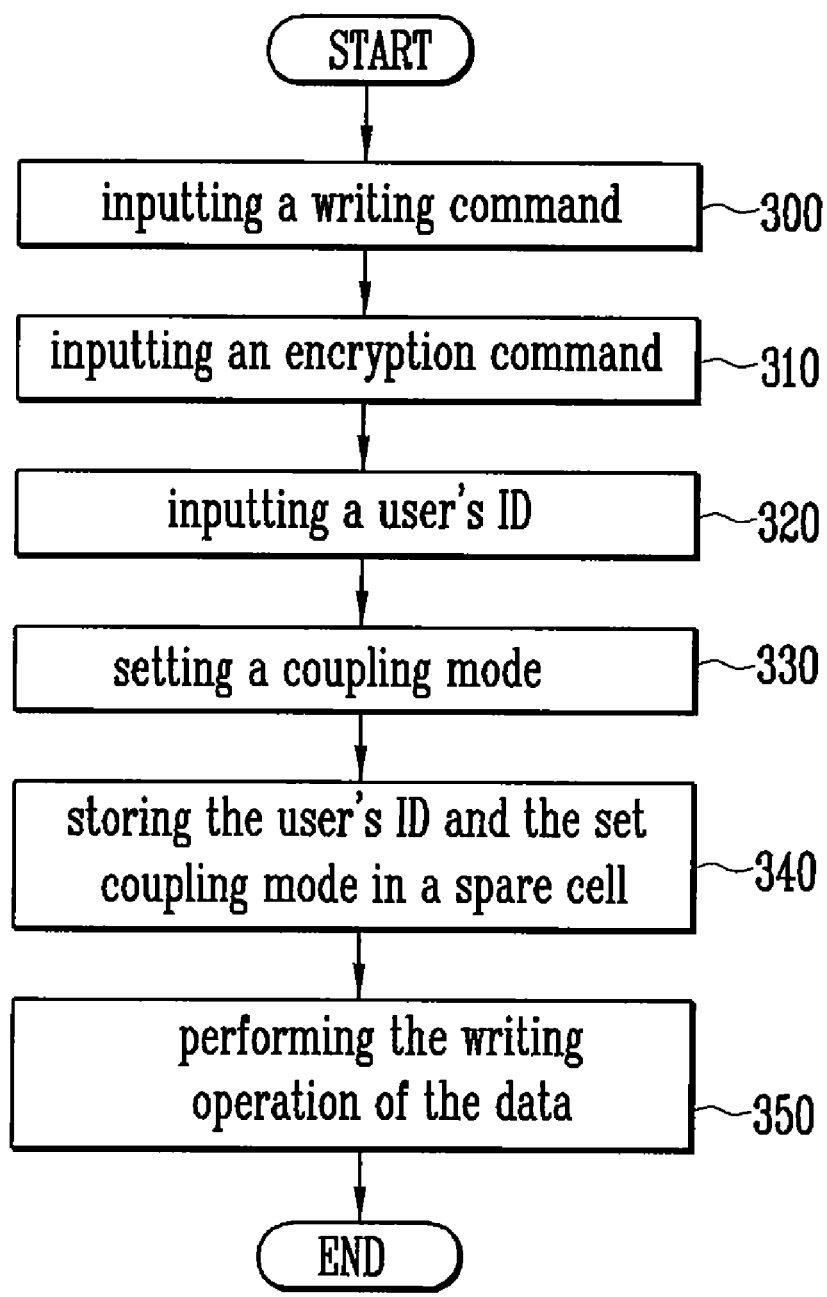
FIG. 3 is a flow chart illustrating a data write operation according to an embodiment of the present invention.

FIG. 3 is a flow chart illustrating a data write operation according to an embodiment of the present invention.

In step 300, a write command for performing a data write operation in a specific memory cell array is input.

In step 310, in the data write operation, the user selects whether or not a data encryption process is performed. In other words, the user determines whether to encrypt the data.

In step 320, when an encryption command is input, the user's ID is also input. The user's ID is stored in the spare cell in the memory cell array, and behaves as a secret number in a data read operation.

In step 330, a certain coupling mode corresponding to N data input/output terminals of the memory device and N data input/output terminals of the page buffer is input in accordance with the user selection. The input coupling mode is set as a coupling mode of the memory device. In one embodiment, the coupling mode may be set by selecting one of a plurality of coupling modes. In another embodiment, the coupling mode may be set by user selection of the data input/output terminals of the page buffer to be coupled to each of the data input/output terminals of the memory device, as described below.

In step 340, the user's ID and the set coupling mode are stored in a spare cell in the memory cell array.

In step 350, the data write operation is performed by coupling the data input/output terminals of the memory device to the data input/output terminals of the page buffer in accordance with the set coupling mode.

Figure 4:
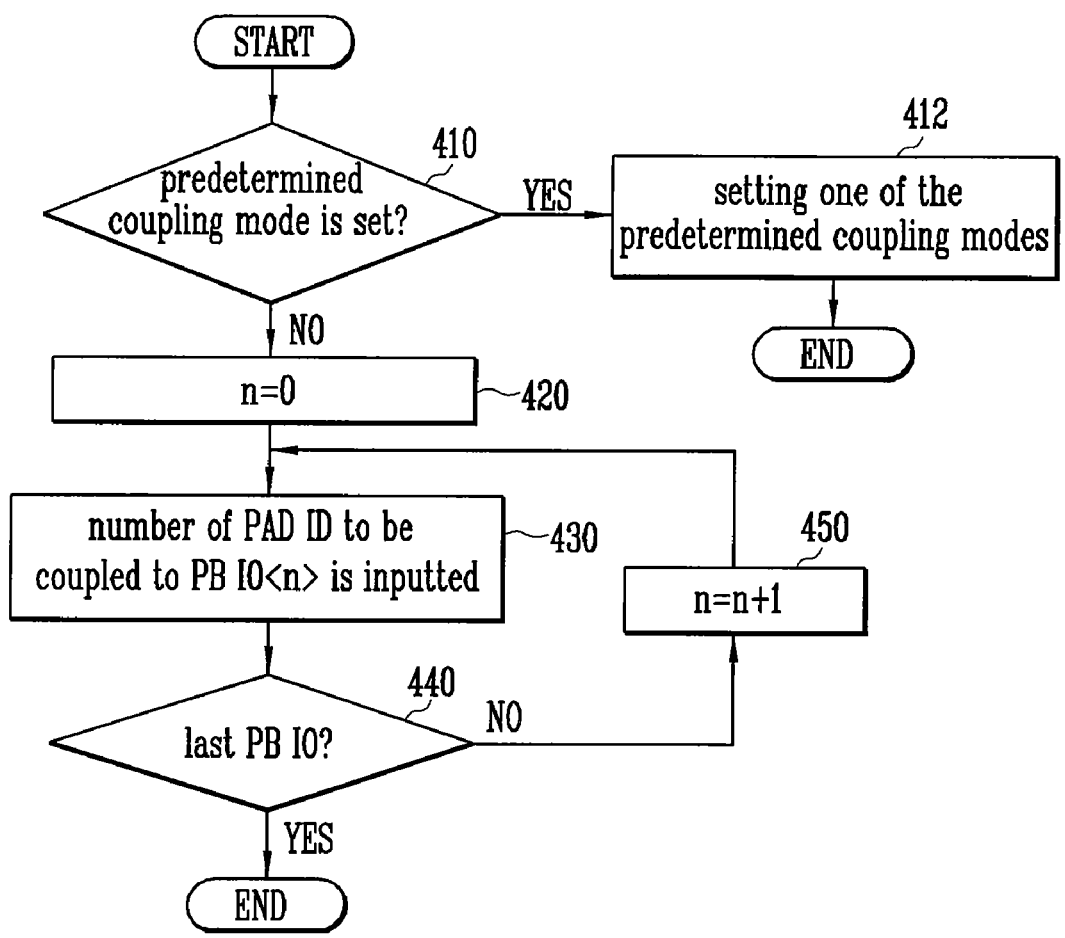
FIG. 4 is a flow chart illustrating a method of setting a coupling mode according to an embodiment of the present invention.

FIG. 4 is a flow chart illustrating a method of setting a coupling mode according to an embodiment of the present invention.

In step 410, it is determined whether one of a plurality of predetermined coupling modes is set as the coupling mode of the memory device, or whether a new coupling mode that is different from one of the predetermined coupling modes is set as the coupling mode of the memory device, in accordance with a user selection.

In step 412, the user selects one of the predetermined coupling modes. The selected coupling mode is stored in a spare cell in a memory cell array. The predetermined coupling modes correspond to coupling configurations between the data input/output terminals of the memory device and the data input/output terminals of the page buffer.

In step 420, in the event that the user selects a new coupling mode, the number of data input/output terminals of the page buffer is initialized.

In steps 440 and 450, the above process is repeated until the number of memory input/output terminals to be coupled to the last input/output terminal (e.g. PB IO<7>) is input.

Figure 5:
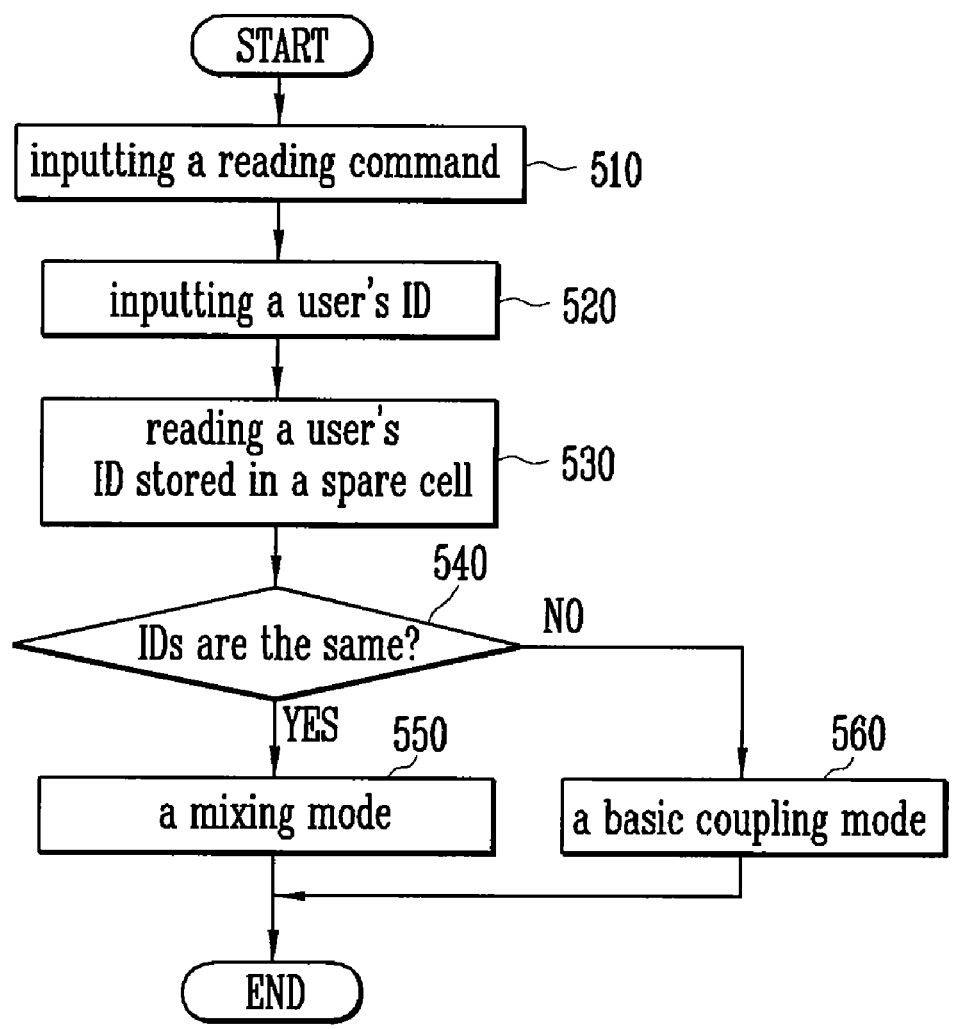
FIG. 5 is a flow chart illustrating a data read operation according to an embodiment of the present invention.

FIG. 5 is a flow chart illustrating a data read operation according to an embodiment of the present invention.

In step 510, a read command for performing a data read operation in a specific memory cell array is input.

In step 520, a user's ID is input.

In step 530, the user's ID stored in the spare cell is read from the spare cell when the write operation is performed.

In step 540, a determination is made whether the input user's ID corresponds to the read user's ID.

In step 550, in the event that the input user's ID corresponds to the read user's ID, the coupling mode stored in the spare cell is read. Subsequently, the user data authenticating section 220 controls the switches of the input/output terminal mixing section 210 so that the input/output terminal mixing section 210 couples the data input/output terminals of the memory device to the data input/output terminals of the page buffer in accordance with the read coupling mode to perform the data read operation in the memory device. Accordingly, the data input/output terminals of the memory device are coupled to data input/output terminals of the page buffer in accordance with the coupling mode set in the write operation. Thus, a normal read operation may be performed without mixing the data.

In step 560, in the event that the input user's ID does not correspond to the read user's ID, the user data authenticating section 220 controls the switches of the input/output terminal mixing section 210 so that the data input/output terminals of the memory device are coupled to those of the page buffer in accordance with a basic coupling mode. In one embodiment, the basic coupling mode is not limited to a method of coupling corresponding data input/output terminals.

In another embodiment, the data read operation may be terminated in the event that the input user's ID does not correspond to the read user's ID. This process is not shown.

Accordingly, the data input/output terminals of the memory device are coupled to those of the page buffer with a coupling configuration different than a coupling configuration in the write operation, such that the data is mixed. As a result, a normal read operation cannot be performed.

Any reference in this specification to "one embodiment," "an embodiment," "example embodiment," etc., means that a particular feature, structure, or characteristic described in connection with the embodiment is included in at least one embodiment of the invention. The appearance of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A non-volatile memory device comprising:
   an input/output terminal mixing section configured to couple a plurality of data input/output terminals of the memory device to a plurality of data input/output terminals of a page buffer in accordance with a selection of a user;
   a user data authenticating section configured to transmit a control signal to the input/output terminal mixing section so that the input/output terminal mixing section couples the data input/output terminals of the memory device to the data input/output terminals of the page buffer in accordance with the selection of the user; and
   a spare cell configured to store the coupling configuration of the data input/output terminals of the memory device and the data input/output terminals of the page buffer in accordance with the selection of the user.

2. The non-volatile memory device of claim 1, wherein the input/output terminal mixing section includes:
   a plurality of switches configured to selectively couple the data input/output terminals of the page buffer to the N data input/output terminals of the memory device.

3. The non-volatile memory device of claim 1, wherein the user data authenticating section receives a specific user's ID, and stores the received user's ID in the spare cell.

4. The non-volatile memory device of claim 3, wherein the user data authenticating section receives a user's ID, and determines whether the received user's ID corresponds to the specific user's ID stored in the spare cell.

5. A method of encrypting data in a non-volatile memory device, the method comprising:
   receiving a user's ID when a data write operation is performed in the memory device;
   receiving a coupling mode of a plurality of data input/output terminals of the memory device and a plurality of data input/output terminals of a page buffer in accordance with a selection of a user;
   storing the user's ID and the coupling mode in a given storage section; and
   coupling the data input/output terminals of the memory device to the data input/output terminals of the page buffer in accordance with the coupling mode, thereby performing the data write operation in the memory device.

6. The method of claim 5, wherein receiving the coupling mode includes:
   determining whether one of a plurality of predetermined coupling modes is selected; and
   in the event that one of the predetermined coupling modes is selected, receiving, in sequence, which of the plurality of the data input/output terminals is to be coupled to each of the data input/output terminals of the page buffer in accordance with the selection of the user.

7. The method of claim 5, further comprising:
   receiving a user's ID when a data read operation is performed after the write operation is finished;
   comparing the received user's ID with the user's ID stored in the storage section; and
   in the event that the received user's ID corresponds to the user's ID stored in the storage section, coupling the data input/output terminals of the memory device to the data input/output terminals of the page buffer, thereby performing the data read operation in the memory device.

8. The method of claim 7, further comprising:
   in the event that the received user's ID does not correspond to the user's ID stored in the storage section, terminating the data read operation.

9. The method of claim 7, further comprising:
   in the event that the received user's ID does not correspond to the user's ID stored in the storage section, performing the data read operation in the memory device by coupling the data input/output terminals of the memory device to the data input/output terminals of the page buffer in accordance with a basic coupling mode.

* * * * *